United States Patent [19]

Froeschke

[11] Patent Number: 4,610,615
[45] Date of Patent: Sep. 9, 1986

[54] APPARATUS FOR THE PRODUCTION OF GRANULES

[75] Inventor: Reinhard Froeschke, Weinstadt, Fed. Rep. of Germany

[73] Assignee: Santrade Ltd., Lucerne, Switzerland

[21] Appl. No.: 733,746

[22] Filed: May 14, 1985

[30] Foreign Application Priority Data

Jun. 9, 1984 [DE] Fed. Rep. of Germany ....... 3421625

[51] Int. Cl.$^4$ .............................................. B28B 1/54
[52] U.S. Cl. ........................................ 425/8; 264/8; 264/13; 425/DIG. 230
[58] Field of Search ................. 425/6, 8, 117, 222, 425/285, 309, 310, 314, 317, 331, 362, 384, 426, DIG. 230; 264/109, 114, 117, 8, 13; 210/396; 65/8

[56] References Cited

U.S. PATENT DOCUMENTS

| 3,518,723 | 7/1970 | Wooding | 425/191 |
| 3,870,447 | 3/1975 | Skretting | 425/225 |
| 4,353,852 | 10/1982 | Tse | 264/37 |

FOREIGN PATENT DOCUMENTS

| 1287045 | 1/1969 | Fed. Rep. of Germany. | |
| 2853054 | 7/1981 | Fed. Rep. of Germany. | |
| 1767381 | 10/1981 | Fed. Rep. of Germany. | |
| 44-15569 | 7/1969 | Japan | 264/140 |
| 250968 | 7/1948 | Switzerland. | |
| 258834 | 5/1949 | Switzerland. | |
| 1169704 | 11/1969 | United Kingdom. | |
| 1012963 | 4/1983 | U.S.S.R. | 264/117 |

Primary Examiner—Donald Czaja
Assistant Examiner—Jennifer E. Cabaniss
Attorney, Agent, or Firm—Burns, Doane, Swecker & Mathis

[57] ABSTRACT

An apparatus for the production of granules from flowable media comprises a cylindrical vessel rotatable about a horizontal axle and being provided with circumferentially spaced orifices through which the medium emerges in the form of droplets. The drops fall onto a cooling conveyor in order to solidify thereon. A collector wall is situated within the vessel and oriented obliquely relative to the horizontal. The medium is dropped onto the collector plate and flows downwardly onto the internal surface of the vessel. The medium falls onto the internal surface ahead of a baffle which presses against the internal surface.

17 Claims, 5 Drawing Figures

APPARATUS FOR THE PRODUCTION OF GRANULES

BACKGROUND AND OBJECTS OF THE INVENTION

The invention relates to an apparatus for the production of granules from a flowable media, which emerges from orifices in a cylindrical rotating vessel having a horizontal axle. The orifices are distributed over the circumference of the vessel. The media falls in the form of droplets which fall and solidify upon a cooling and conveying installation located under the vessel and moving transversely to the vessel. The emergence of the droplets from the vessel is effected by a stop arranged within the vessel and made to be stationary with respect to the wall of the rotating vessel.

Apparatuses are known (e.g., see Nos. DE-AS 12 870 45 and DE-AS 17 673 81) in which diametrically opposed pressure rolls are provided with their axle parallel to the axis of the vessel so as to roll upon the inner wall of the vessel. By means of these pressure rolls, employed in the processing of sugar sludge or the production of foodstuffs, the viscous mass contained in the vessel is forced out through the orifices between the pressure rolls and the rotating vessel, whereupon it is divided into granulating strands of suitable length by blades contacting the vessel exterior.

Apparatuses of that type have the disadvantage, in addition to the problem of wear of the rolling parts, that they cannot be used for the granulation of highly flowable materials that would emerge in the form of droplets.

There is further known an installation (e.g., see No. DE-28 53 054), wherein two coaxial telecoping cylindrical vessels in contact with each other are rotated relative to each other. Only one of the vessels is provided with passage orifices distributed over its circumference and the other vessel is equipped only with orifices facing a cooling belt located under it. In this arrangement, therefore, the orifices of each vessel are aligned intermittently with the orifices of the other vessel in the course of rotation, so that easily flowing masses emerge in the form of droplets and are then able to solidify on a cooling belt moving underneath. However, since the entire internal space of the inner vessel is filled with the mass to be granulated, the metering of the emerging droplets is very difficult, especially in the case of very thin flowing masses.

It is, therefore, an object of the present invention to further develop apparatuses of the afore-mentioned type so that they will be able to drip, and process into granules, media of very low or medium viscosity.

SUMMARY OF THE INVENTION

The invention relates to an installation of the afore-mentioned type in that the stop device comprises a baffle abutting against the lower half of the vessel wall and cooperating with a collector wall oriented obliquely to the horizontal. The medium is fed into the vessel in the area above the collector wall.

The collector wall may comprise a flat plate having a width smaller than the radius of the vessel. This configuration is appropriate if the dripping is to be effected only by the height of the medium backing up in front of the baffle.

The collector may, however, comprise a plate that is wider than the radius of the vessel and constitutes the upper boundary of a body supported pivotingly on the axis of the vessel, upon which the baffle is also located. The embodiment permits more variations, because, firstly, the inclination of the collector wall is adjustable and, secondly, the residual material still present in the orifices of the vessel, which drips back into the vessel during its further rotation, always falls onto the collector plate and thus returns to the area in front of the baffle. Also, the collector in this case separates a larger area in the upward direction and in this manner makes possible the feeding of the medium to be dripped into an area, which under certain conditions is clearly located in front of the lowest peripheral point of the vessel having the shortest distance to the cooling facility. The process of the formation of droplets, may in this manner, be greatly affected, and it has been determined that the novel installation is capable of operating with very high rotating velocities of the vessel and thus has a high capacity.

The body pivotingly supported in the vessel may advantageously be of a hollow configuration, in which heating devices are arranged for the heating of the collector wall. The body, therefore, may comprise advantageously an ashlar-shaped hollow body with a triangular cross-section, so that the collector wall is contiguous with another surface of the body which may form the baffle or be located in front of another element which forms the baffle. It is further possible to support the baffle adjustably on the body, for example, by fastening arms located laterally from the body and capable of being pivoted from outside the vessel. In this manner, the angle of the baffle in relation to the collector wall may be adjusted so that, as mentioned above, it may operate as a kind of forcing blade, in order to press media of medium viscosity down through the orifices mechanically, in addition to the effect of gravity. The application spectrum of the novel apparatus is thus very broad.

Advantageously, a cooling conveyor moving perpendicularly to the axis of the vessel is provided as the cooling installation. The flowable media are introduced preferably at an elevated temperature through a heated pipe extending parallel to the axis of the vessel, so that as a function of the pressure prevailing in the pipe, smaller or larger amounts may be transported into the vessel. The pipe may be arranged over the collector wall so that the medium introduced is conducted initially in an approximately horizontal manner over the collector wall and only then to the baffle at the bottom. As it is possible to heat this area, the viscosity of the medium to be dripped may be affected in a very sensitive manner up to the exit area, so that in addition to the adjustments possible by means of the position of the collector wall and the baffle in relation to the wall of the vessel, there exists a further possibility to affect the formation of the droplets. Finally, the vessel may be surrounded in the area of its upper half with a heating hood to cause the residual material possibly still present in the orifices, to drop into the inside of the vessel. The material is therein returned to the location intended for the dripping process and cannot have a detrimental effect.

BRIEF DESCRIPTION OF THE DRAWING

The objects and advantages of the invention will become apparent from the following detailed description of a preferred embodiment thereof in connection with the accompanying drawings in which like numerals designate like elements, and in which.

DETAILED DESCRIPTION OF A PREFERRED EMBODIMENT OF THE INVENTION

Figure 1:
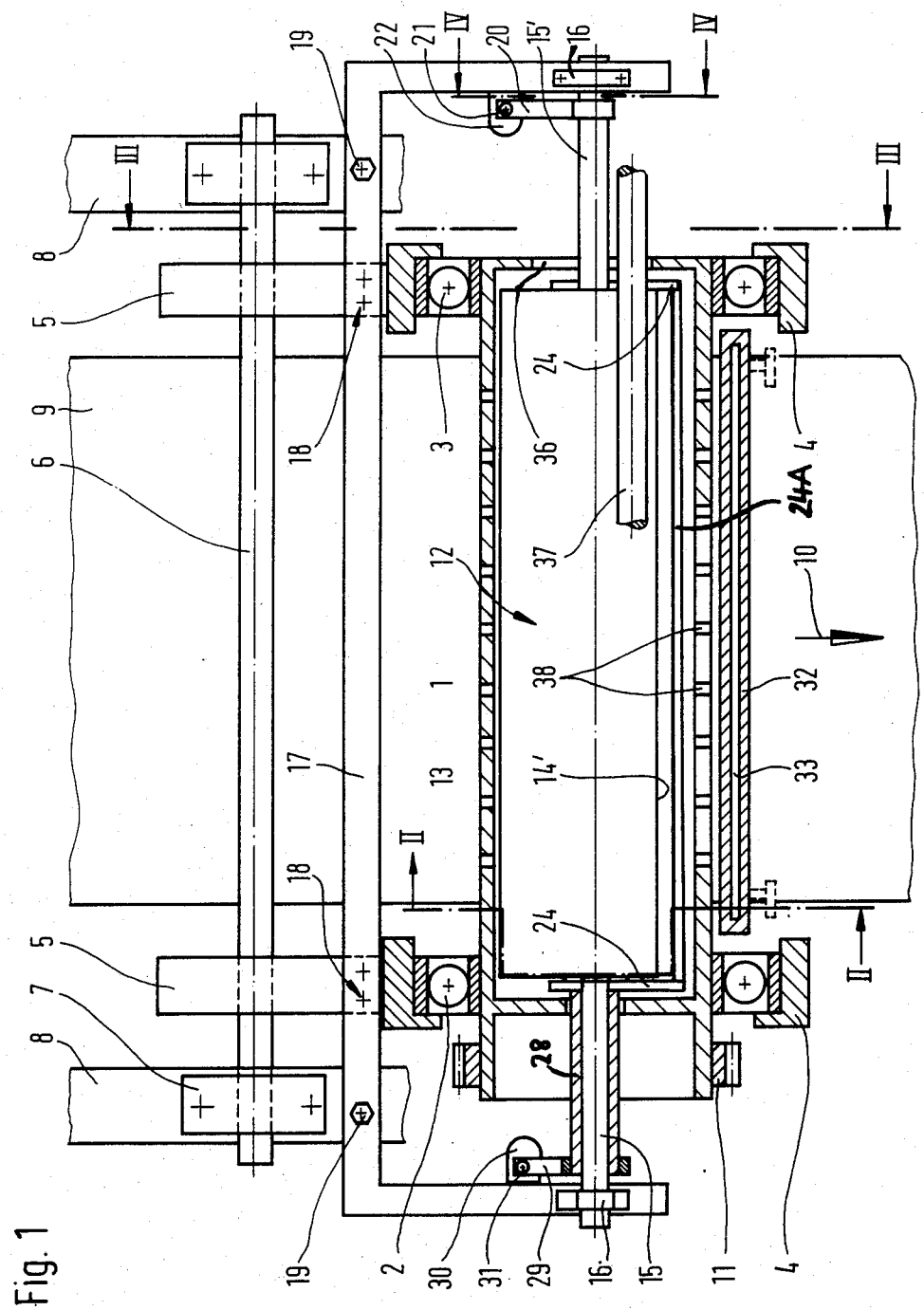
FIG. 1 shows a top view of the apparatus for the production of granules, in a longitudinal section.
Figure 2:
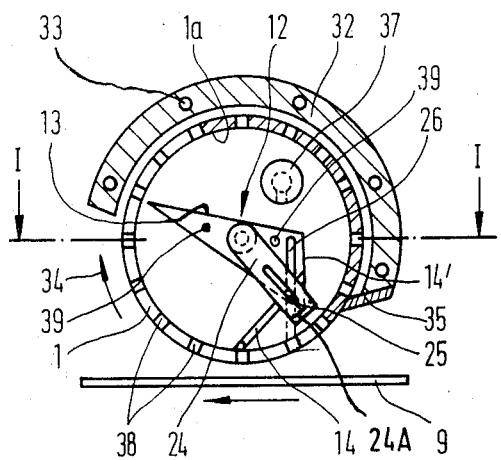
FIG. 2 is a partial section through the apparatus of FIG. 1 along the line II—II.

FIGS. 1 and 2 show a cylindrical vessel 1, supported rotatingly in ball bearings 2 and 3 which are seated in holding shells 4. Each shell 4 includes a fastening arm 5 which is pivotably mounted to an axle 6 for limited pivotal movement. The axle 6 is held in bearing brackets 7 which are fixedly joined by screws to the longitudinal beams 8 of a stationary stand. A cooling conveyor 9 travels between the beam 8 in the direction of the arrow 10 (in a manner not shown in detail) and is sprayed, for example, from below with a cooling liquid.

The vessel 1 is rotated by means of a tooth gear 11 fixedly joined to it and connected (in a manner not shown) with a drive source. In the vessel, a hollow body 12 is arranged, which is preferably in the form of an ashlar with a triangular cross-section. An upper side of the body 12 forms a plate 13 extending obliquely to the horizontal (line I—I). The width of the plate is less than the diameter of the wall 1a. The plate 13 forms an angle greater than 0° and up to 45° with the horizontal.

Figure 3:
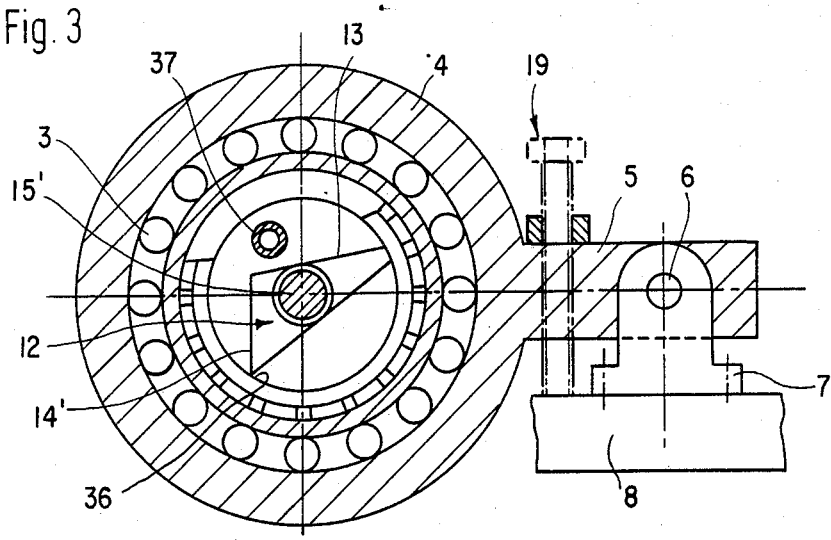
FIG. 3 is a view of the apparatus of FIG. 1 in the direction of the arrows III—III.
Figure 4:
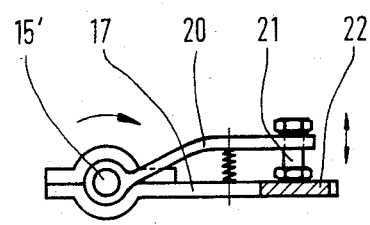
FIG. 4 is a view in the direction of the arrows IV—IV at an enlarged scale.

This plate constitutes a collector wall, the function whereof will be explained below. The right side of the body 12 extends downwardly to a baffle 14, which is preceded by a face 14' angled relative to the plate 13. The hollow body 12 is fixedly connected on both of its sides with an axle journal 15, 15' which are each held in bearings 16 in a pivoting manner. The bearings 16 are fastened by screws to a strap 17 which extends across the fastening arms 5 of the bearings 2 and 3, and is fixedly joined to the arms 5 at two locations 18. The fastening arms 5 are adjusted about the axle 6 by means of screws 19, supported on the beams 8. One of these screws 19 is indicated schematically in FIG. 3 to illustrate its adjusting function.

If desired, the width of the plate 13 can be less than the radius of the internal surface 1a.

The axle journal 15' is connected for common rotation with a lever arm 20. The lever arm 20 is supported by means of a screw 21 on a bracket 22 which, in turn, is fixedly joined to the strap 17. With the aid of the lever arm 20, therefore, the hollow body 12 is kept stationary, i.e., is held against rotation relative to the vessel 1. The body 12 may, however, be pivoted by adjusting the screw 21, relative to the vessel 1.

Figure 5:
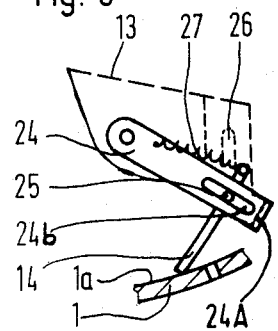
FIG. 5 is an enlarged view of a detail from FIG. 2.

On the axle journals 15 and 15', levers 24 are supported laterally, in order to hold the baffle 14 adjustably in its position in relation to the vessel 1. For this purpose, the fastening levers 24 are connected with each other by means of a transverse strap 24A and are provided with elongated holes 24b, which are engaged by lugs 25 projecting laterally from the baffle 14. The lugs 25 are also guided in a longitudinal slot 26 formed on the hollow body 12. The baffle 14 has an upper end disposed remotely of the inner wall 1a of the vessel, which end extends past the lug 25 and is connected to tension springs 27. The tension springs are also secured to the fastening levers 24. As seen in FIG. 5, in this manner, the lower end of the baffle 14 is always biased firmly against the inner wall 1a of the vessel. The position of such lower end with respect to the vessel wall, i.e., the angle included between the lower end and a tangent applied to the inner wall 1a at the point of contact of the lower end, is determined by the position of the fastening lever 24. If the lever 24 is pivoted from its position in FIG. 5 in a counter-clockwise direction, the baffle 14 will occupy a position steeper than the one shown. If the lever is pivoted in the clockwise direction, the angle between the baffle 14 and the abovementioned tangent becomes more acute. The adjustment of the fastening lever 24 is effected in that one of the fastening levers (i.e., the left one in FIG. 1) is connected for common rotation with a sleeve 28. The sleeve 28 is connected for common rotation with a lever 29 supported in a manner similar to the previously described lever 20 of the axle journal 15' by means of an adjusting screw 31 on a bracket 30, which is connected fixedly with the strap 17.

The vessel 1 is covered in its upper area by a heating hood 32, equipped with flow conduits 33 for a heating medium, for example, heated oil, or with electric heating rods. A forcing blade 35 (FIG. 2) is arranged at the trailing end of the hood 32 (with reference to the direction of rotation 34). That blade 35 presses any material still adhering on the outside to the vessel 1 into the orifice passing by it.

The material to be dripped is fed into the inside of the vessel through a frontal opening 36 of the vessel 1 by means of a pipe 37, equipped with outflow orifices directed downwardly in the direction of the collector wall of the plate 13.

IN OPERATION, a material to be dripped is fed into the vessel 1 through the pipe 37 in a flowable state, preferably at an elevated temperature. The medium emerges through the downward directed orifices of the oipe 37 and flows in strips onto the collector plate 13 and over the edge between the collector plate 13 and the downwardly extending wall 14'. The strips arrive in an area ahead of, i.e., leading, the baffle 14 and either (1) are pressed to the outside through the orifices 38 by the baffle 14 in the case of a viscous medium, or (2) in the case of a low viscous medium, flow through the orifices 38 under the influence of gravity and the static pressure built up in front of the baffle 14. From there, the medium drops in droplet form onto the cooling conveyor 9 and is allowed to solidify or gel in the droplet form. It would obviously also be possible to provide, in lieu of the conveyor 9, a flowing medium (for example water) as the cooling means, to the extent that this may be feasible in a particular case.

Any residual material in the orifices 38 is reheated by the heating hood 32 to its melting temperature, whereupon it drops back into the vessel and onto the collector wall 13 provided for the purpose, and is conveyed, together with the material introduced through the pipe 37, again into the area in front of the baffle 14.

In lieu of a separate baffle element 14, the flow wall 14' could be extended to press against the internal wall 1a and thus define the baffle.

In order to facilitate the reflux and to obtain another possibility for the formation of droplets by affecting the viscosity, the hollow body 12 may also be provided on the inside with heating means, for example, with the tubes 39 for the flow of heater oil, or with electric heating rods or the like, which permit the heating and temperature control of the collector plate 13 and the flow wall 14'.

The arrangement according to the present invention offers the advantage that only the space located over the collector wall and in front of the baffle in the vessel need be filled with the medium to be dripped, so that it is possible, for example, to carry out the dripping process exclusively under the effect of the static pressure of the medium backing up against the baffle. It is, however, also possible to pass the medium over the collector wall in the manner of an overflow weir and to press it out with the aid of the baffle through the orifices, if the baffle is set at an acute angle to a tangent placed against the vessel wall. The novel configuration therefore offers a greater number of possible variations and adaptations to the medium to be dripped, as has been the case heretofore in the state of the art.

Although the present invention has been described in connection with preferred embodiments thereof, it will be appreciated by those skilled in the art that additions, deletions, modifications, and substitutions, not specifically described, may be made, without departing from the spirit and scope of the invention as defined by the appended claims.

What is claimed is:

1. Apparatus for the production of granules from a flowable medium comprising:
    a cylindrical vessel rotatable about a horizontal axis, said vessel including a plurality of orifices distributed circumferentially around said vessel through which the medium can flow from inside the vessel,
    a collector wall disposed stationarily within said vessel and extending obiquely relative to a horizontal plane containing said axis, so as to include upper and lower ends, said lower end being spaced above an internal surface of said vessel,
    means for introducing a flowable medium into said vessel such that the introduced flowable medium falls downwardly onto said collector wall and flows downwardly thereupon and over said lower end and onto said internal surface of said vessel,
    a baffle surface disposed in said vessel extending downwardly and pressing against a bottom region of said internal surface of said vessel and positioned so that the flowable medium flowing over said lower end and onto said internal surface is situated ahead of said baffle surface with reference to the rotation of said vessel so that said baffle surface exerts pressure against the medium to promote the flow of medium through said orifices,
    said vessel being rotatable relative to said collector wall and baffle, and
    cooling means disposed beneath said vessel and movable relative thereto and arranged to receive the medium falling from said orifices,
    said upper end of said collector wall extending to a location closely adjacent said internal surface of said vessel, and said collector wall arranged to overlie a space in said vessel located behind said baffle surface such that residual medium gravitating from said orifices above said space can fall onto said collector wall and travel downwardly therealong to said lower end,
    said apparatus further comprising a stationary heating means disposed within said vessel for heating said collector wall.

2. Apparatus according to claim 1, wherein said baffle is oriented at an acute angle relative to a tangent applied to the internal surface of said vessel at the point where said lower end of said baffle contacts said inner surface.

3. Apparatus according to claim 1, wherein said collector wall comprises a flat plate having a width lying in a plane extending perpendicularly to said horizontal axis, said width being smaller than the diameter of said vessel internal surface.

4. Apparatus according to claim 3, wherein said plate is wider than the radius of the vessel internal surface and constitutes an upper surface of a body pivotably supported on the axis of rotation of said vessel, said baffle being affixed to said body.

5. Apparatus according to claim 4, wherein said plate forms an angle greater than 0° and up to 45° relative to said horizontal plane.

6. Apparatus according to claim 5, wherein said body is hollow, with said heating means disposed within said body to heat said collector wall.

7. Apparatus according to claim 5, wherein said body is an ashlar-shaped hollow body with a triangular cross-section, said body including a flow wall extending downwardly from said lower end of said collector wall.

8. Apparatus according to claim 5, wherein said baffle is supported adjustably relative to said body.

9. Apparatus according to claim 8, wherein a pair of fastening arms are situated adjacent opposite longitudinal ends of said body and are rotatable relative to said body about said axis, said baffle being carried by said fastening arms.

10. Apparatus according to claim 9, wherein said body is carried by axles which are coaxial with said axis of rotation of said vessel, a bushing being coaxially mounted on one of said axles and being rotatable relative thereto, said fastening arms being operably connected to said bushing.

11. Apparatus according to claim 1, wherein said cooling means comprises a cooling conveyor moving transversely relative to said axis of rotation.

12. Apparatus according to claim 1, wherein a heated hollow pipe enters said vessel parallel to said axis of rotation, said pipe being provided with downwardly directed outflow orifices, said medium being conducted into said vessel through said pipe.

13. Apparatus according to claim 1, including a heating hood surrounding a portion of the upper half of said vessel to heat medium which does not fall completely through said orifices.

14. Apparatus according to claim 1, wherein a forcing blade contacts an outer exterior circumference of said vessel in an area located ahead of said baffle with reference to the rotation of said vessel.

15. Apparatus according to claim 13, wherein said forcing blade is mounted on a lower end of said heating hood.

16. Apparatus according to claim 15, wherein said collector wall and said baffle are removable from said vessel.

17. Apparatus according to claim 3, wherein the width of said plate is less than the radius of said vessel internal surface.

* * * * *